United States Patent
Ito et al.

(10) Patent No.: US 10,650,291 B2
(45) Date of Patent: May 12, 2020

(54) DEVICE FOR SIMULATING AN IMAGE FORMING APPARATUS

(71) Applicant: Konica Minolta, Inc., Tokyo (JP)

(72) Inventors: Yasutaka Ito, Amagasaki (JP); Hisashi Uchida, Kyoto (JP); Hiroaki Kubo, Muko (JP); Tomoaki Nakajima, Kobe (JP); Yoshiaki Shibuta, Itami (JP); Hideaki Soejima, Amagasaki (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/157,768

(22) Filed: Oct. 11, 2018

(65) Prior Publication Data

US 2019/0109960 A1 Apr. 11, 2019

(30) Foreign Application Priority Data

Oct. 11, 2017 (JP) .................. 2017-197866

(51) Int. Cl.
*G06K 15/02* (2006.01)
*H04N 1/00* (2006.01)

(52) U.S. Cl.
CPC ....... *G06K 15/025* (2013.01); *H04N 1/00244* (2013.01); *H04N 1/00915* (2013.01); *H04N 1/00973* (2013.01); *H04N 2201/0094* (2013.01)

(58) Field of Classification Search
CPC .... G06K 15/025; G06F 3/1297; G06F 3/1256
See application file for complete search history.

(56) References Cited

U.S. PATENT DOCUMENTS

2009/0219557 A1\* 9/2009 Lifshitz ................. G06F 3/1208
358/1.13

FOREIGN PATENT DOCUMENTS

JP 2007-168302 A 7/2007

\* cited by examiner

*Primary Examiner* — Eric A. Rust
(74) *Attorney, Agent, or Firm* — Osha Liang LLP

(57) ABSTRACT

A simulation device includes: a simulator simulating an information processing device; a virtual execution controller executing a job identical to a job executed by the information processing device, while a parameter different from a parameter set in the information processing device, is set in a virtual device in which the simulator simulates the information processing device, by controlling the simulator, when the information processing device is out of a preset admissibility condition; a parameter determinator determining the parameter set in the virtual device, as a change parameter, when the virtual device while the virtual device executes the job, satisfies the admissibility condition; and a setter controlling the information processing device such that the determined change parameter is set in the information processing device, when an environment of the information processing device becomes identical to an environment when the information processing device is out of the admissibility condition.

8 Claims, 12 Drawing Sheets

FIG. 8

RULE PARAMETER

| TASK TYPE | CORE 1 | CORE 2 | CORE 3 | CORE 4 |
|---|---|---|---|---|
| VECTOR DATA GENERATION | O | O | | |
| RASTERIZATION | O | O | | |
| DATA CONVERSION | O | | | |
| COMMUNICATION | O | | | |
| SCANNING | O | | | |
| BROWSING | | | O | |
| INTERNAL SERVER | | | | O |

FIG. 9

| CORE 1 | CORE 2 | CORE 3 | CORE 4 |
|---|---|---|---|
| | | | IWS |
| | | Browser | |
| Scan | | Browser | |
| Conv | | Browser | |
| Nicfum | | Browser | |
| | Raster4 | Browser | |
| | Raster3 | Browser | |
| Raster2 | | Browser | |
| Raster1 | | Browser | |
| | Rip4 | Browser | |
| | Rip3 | Browser | |
| Rip2 | | | |
| Rip1 | | | |

FIG. 10

LOAD (USE RATE %)

| TASK | CORE 1 | CORE 2 | CORE 3 | CORE 4 |
|---|---|---|---|---|
| Rip1 | 40 | | | |
| Rip2 | 40 | | | |
| Rip3 | | 20 | | |
| Rip4 | | 20 | | |
| Raster1 | 5 | | | |
| Raster2 | 5 | | | |
| Raster3 | | 30 | | |
| Raster4 | | 30 | | |
| Nicfum | 8 | | | |
| Conv | 1 | | | |
| Scan | 1 | | | |
| Browser | | | 30 | |
| IWS | | | | 5 |
| TOTAL | 100 | 100 | 30 | 5 |

FIG. 11

CHANGE PARAMETER

| TASK TYPE | CORE 1 | CORE 2 | CORE 3 | CORE 4 |
|---|---|---|---|---|
| VECTOR DATA GENERATION | O | O | | |
| RASTERIZATION | O | O | O | O |
| DATA CONVERSION | O | | | |
| SCANNING | O | | | |
| BROWSING | O | | O | |
| SERVER | | | | O |

LOAD (USE RATE %)

| TASK | CORE 1 | CORE 2 | CORE 3 | CORE 4 |
|---|---|---|---|---|
| Rip1 | 40 | | | |
| Rip2 | 40 | | | |
| Rip3 | | 40 | | |
| Rip4 | | 40 | | |
| Raster1 | | | 30 | |
| Raster2 | | | 30 | |
| Raster3 | | | | 40 |
| Raster4 | | | | 40 |
| Nicfum | 8 | | | |
| Conv | 1 | | | |
| Scan | 1 | | | |
| Browser | | | 30 | |
| IWS | | | | 5 |
| TOTAL | 90 | 80 | 90 | 85 |

DEVICE FOR SIMULATING AN IMAGE FORMING APPARATUS

CROSS-REFERENCE TO RELATED APPLICATIONS

The entire disclosure of Japanese patent Application No. 2017-197866, filed on Oct. 11, 2017, is incorporated herein by reference in its entirety.

BACKGROUND

Technological Field

The present invention relates to a simulation device, a device setting method, and a device setting program, and in particular, relates to a simulation device simulating an information processing device, and a device setting method and a device setting program to be executed by the simulation device.

Description of the Related Art

An image forming device represented by a multi-function peripheral (MFP) has a plurality of functions, and thus, an environment to be used is different according to a user. For this reason, even in MFPs having the same setting, the performance of the MFP is capable of being sufficiently exhibited in the case of being used by a certain user, but the performance of the MFP is not capable of being sufficiently exhibited in the case of being use by the other user. This is because the function to be executed by the MFP is different, or the type or the amount of data to be processed by the MFP is different, according to the user.

In JP 2007-168302 A, a printing device performing printing processing in page unit in a plurality of processing steps, including an acquisition unit acquiring verification information relevant to the printing processing in the page unit in each processing step of the plurality of processing steps; and an output controller outputting the verification information acquired by the acquisition unit by corresponding the verification information to each of the processing steps, is described as a technology of detecting a factor of decreasing the performance of the device.

However, the printing device described in JP 2007-168302 A, the verification information relevant to the printing processing in the page unit in each of the processing steps of the plurality of processing steps is output by corresponding the verification information to each of the processing steps, and thus, the user is only capable of assuming a step which is a factor of decreasing the printing performance, with reference to the output, and it is necessary for the user to determine a setting value for solving the factor of decreasing the printing performance. In addition, it is difficult to determine an optimal setting value common in a plurality of users.

SUMMARY

According to one or more embodiments of the present invention, a simulation device is capable of setting an information processing device to be in a state suitable for a use environment.

According to one or more embodiments of the present invention, a device setting method is capable of setting an information processing device to be in a state suitable for a use environment.

According to one or more embodiments of the present invention, a device setting program is capable of setting an information processing device to be in a state suitable for a use environment.

According to one or more embodiments of the present invention, a simulation device comprises: a simulator that simulates an information processing device; a virtual execution controller that executes a job identical to a job executed by the information processing device, in a state in which a parameter different from a parameter set in the information processing device, is set in a virtual device in which the simulator simulates the information processing device, by controlling the simulator, in a case where a state of the information processing device is out of an admissibility condition set in advance; a parameter determinator that determines the parameter set in the virtual device, as a change parameter, in a case where a state of the virtual device while the virtual device executes the job, satisfies the admissibility condition; and a setter that controls the information processing device such that the determined change parameter is set in the information processing device, in a case where an environment of the information processing device becomes identical to an environment at a time point when the state of the information processing device is out of the admissibility condition.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 8 is a diagram illustrating an example of a rule parameter;

FIG. 9 is a first diagram illustrating an example of assigning a task to four CPU cores;

FIG. 10 is a first diagram illustrating a use rate for each of the tasks with respect to each of four CPU cores;

FIG. 11 is a diagram illustrating an example of a change parameter;

DETAILED DESCRIPTION

Figure 1:
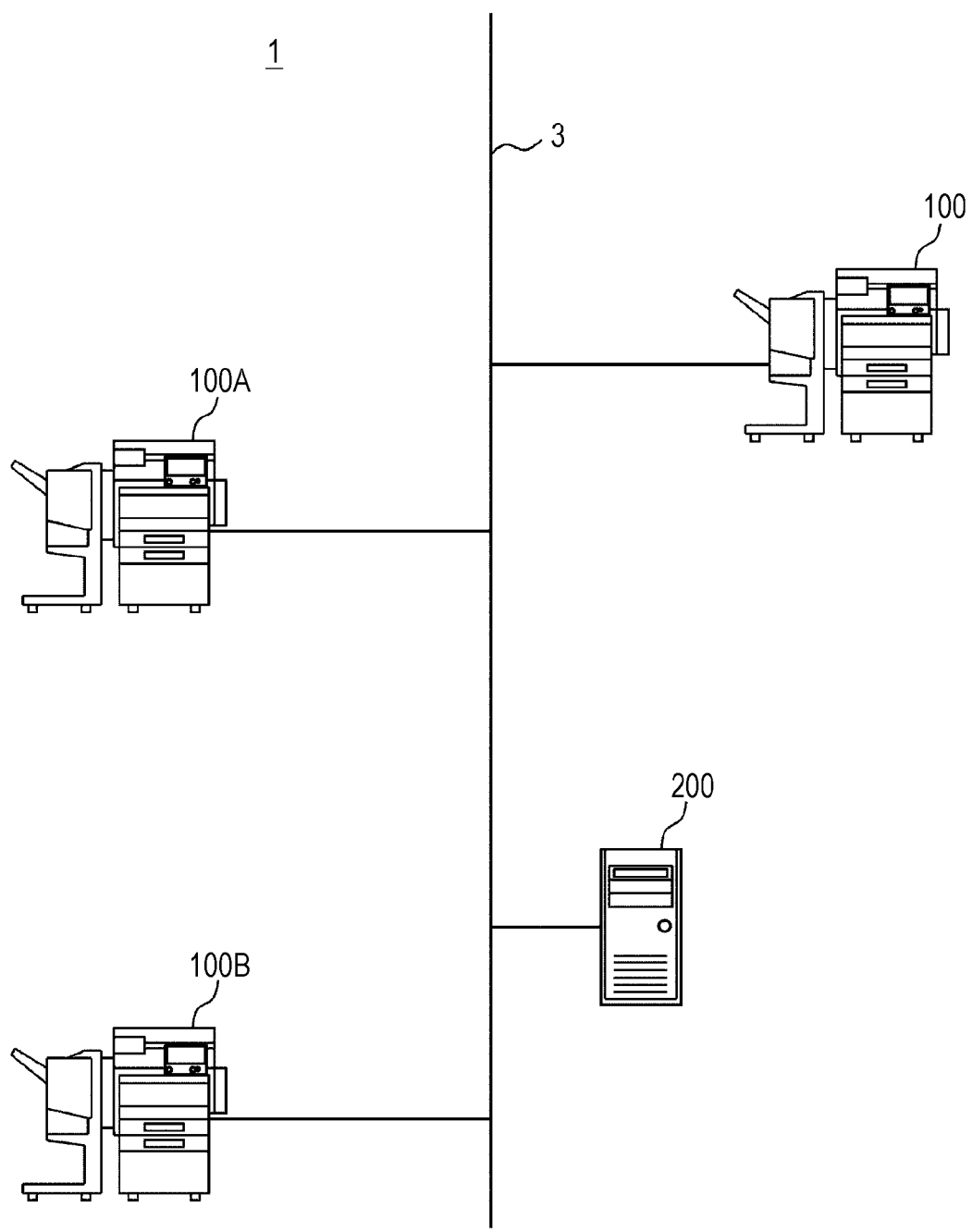
FIG. 1 is a diagram illustrating an example of an overall outline of an information processing system according to one or more embodiments of the present invention.

Hereinafter, one or more embodiments of the present invention will be described with reference to the drawings. However, the scope of the invention is not limited to the disclosed embodiments. In the following description, the same reference numerals will be applied to the same components. The same components have the same names and the same functions. Accordingly, the detailed description of each of the same components will not be repeated.

FIG. 1 is a diagram illustrating an example of an overall outline of an information processing system according to one or more embodiments of the present invention. With reference to FIG. 1, an information processing system 1 includes MFPs 100, 100A, and 100B, and a server 200.

The MFPs 100, 100A, and 100B are an example of an image forming device, and have at least an image forming function for forming an image on a recording medium such as a sheet, on the basis of image data. The MFPs 100, 100A, and 100B may have a manuscript reading function for reading a manuscript, and a facsimile transmitting/receiving function of transmitting/receiving facsimile data, in addition to the image forming function. The server 200 is a general computer.

The server 200 and each of the MFPs 100, 100A, and 100B are connected to a network 3. The network 3 is a local area network (LAN), and a connection mode may be a wired mode or a wireless mode. Further, the network 3 may be connected to the internet. In this case, the server 200 and each of the MFPs 100, 100A, and 100B are capable of communicating with a computer connected to the internet through the network 3. In addition, the network 3 is not limited to the LAN, and may be a network using public switched telephone networks. Further, the network 3 may be a wide area network (WAN) such as the internet.

Figure 2:
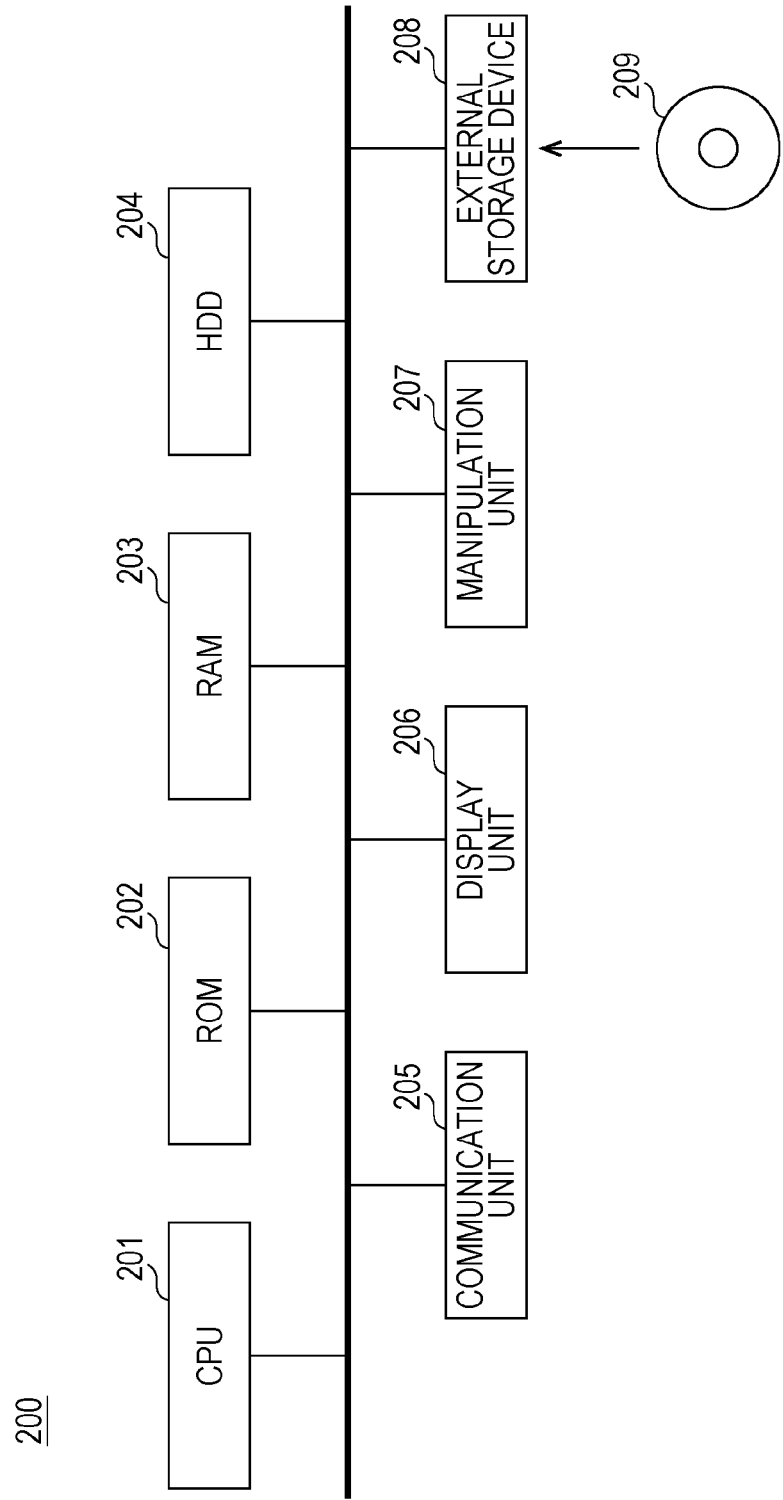
FIG. 2 is a block diagram illustrating an example of an outline of a hardware configuration of a server according to one or more embodiments of the present invention.

FIG. 2 is a block diagram illustrating an example of an outline of a hardware configuration of the server according to one or more embodiments of the present invention. With reference to FIG. 2, the server 200 includes a central processing unit (CPU) 201 for controlling the entire server 200, a read only memory (ROM) 202 storing a program to be executed by the CPU 201, a random access memory (RAM) 203 to be used as a working area of the CPU 201, a hard disk drive (HDD) 204 volatilely storing data, a communication unit 205 connecting the CPU 201 to the network 3, a display unit 206 displaying information, a manipulation unit 207 receiving a manipulation input by a user, and an external storage device 208.

The display unit 206 is a display device such as a liquid crystal display device (LCD) and an organic electro-luminescence display (ELD). The manipulation unit 207 is a hard key such as a keyboard. In addition, the manipulation unit 207 may be a touch panel. The touch panel is disposed to be superimposed on an upper surface or a lower surface of the display unit 206. The touch panel detects a position on a display surface of the display unit 206, which is instructed by the user.

The communication unit 205 is an interface for connecting the CPU 201 to the network 3. The communication unit 205 is a communication protocol such as a transmission control protocol (TCP) or a user datagram protocol (UDP), and communicates with the MFPs 100, 100A, and 100B connected to the network. Furthermore, the protocol for communication is not particularly limited, and an arbitrary protocol can be used. An internet protocol (IP) address of each of the MFPs 100, 100A, and 100B is registered in the server 200, and thus, the server 200 is capable of communicating with each of the MFPs 100, 100A, and 100B, and the data is capable of being transmitted/received.

The HDD 204 stores the program to be executed by the CPU 201, or data necessary for executing the program. The CPU 201 executes the program recorded in the HDD 204 by loading the program in the RAM 203.

A compact disk ROM (CD-ROM) 209 storing a program, is mounted on the external storage device 208. The CPU 201 is capable of accessing the CD-ROM 209 through the external storage device 208. The CPU 201 executes the program recorded in the CD-ROM 209 which is mounted on the external storage device 208, by loading the program in the RAM 203. Furthermore, a medium storing the program to be executed by the CPU 201 is not limited to the CD-ROM 209, and may be a semiconductor memory such as an optical disk (a magnetic optical disc (MO)/a mini disc (MD)/a digital versatile disc (DVD)), an IC card, an optical card, a mask ROM, or an erasable programmable ROM (EPROM).

In addition, the program to be executed by the CPU 201 is not limited to the program recorded in the CD-ROM 209, and the program stored in the HDD 204 may be executed by being loaded in the RAM 203. In this case, the other computer connected to the network 3, may rewrite the program stored in the HDD 204, or may additionally write a new program. Further, the server 200 may download the program from the other computer connected to the network 3 or the internet, and may store the program in the HDD 204. Here, the program includes not only a program which can be directly executed by the CPU 201, but also a source program, a compressed program, an encoded program, and the like.

Figure 3:
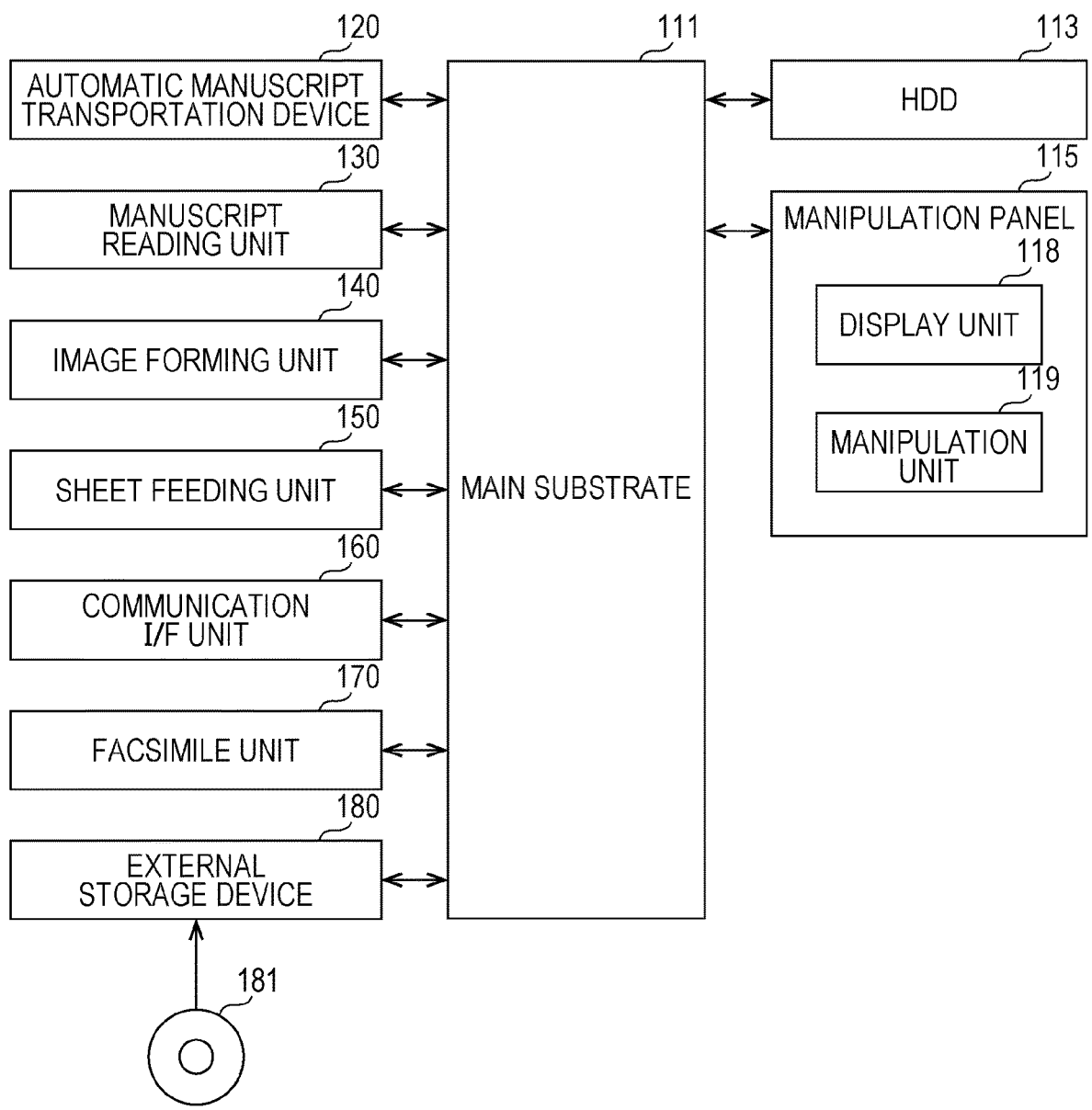
FIG. 3 is a block diagram illustrating an example of an outline of a hardware configuration of an MFP according to one or more embodiments of the present invention.

The hardware configurations and the functions of the MFPs 100, 100A, and 100B are the same, and thus, the MFP 100 will be described here, as an example. FIG. 3 is a block diagram illustrating an example of an outline of a hardware configuration of the MFP according to one or more embodiments of the present invention. With reference to FIG. 3, the MFP 100 includes a main substrate 111, a manuscript reading unit 130 for reading a manuscript, an automatic manuscript transportation device 120 for transporting the manuscript to the manuscript reading unit 130, an image forming unit 140 for forming an image on a sheet or the like, on the basis of image data which is output by reading the manuscript by the manuscript reading unit 130, a sheet feeding unit 150 for feeding a sheet to the image forming unit 140, a communication interface (I/F) unit 160, a facsimile unit 170, an external storage device 180, a hard disk drive (HDD) 113 as a large-capacity storage device, and a manipulation panel 115 as a user interface.

The main substrate 111 is connected to the automatic manuscript transportation device 120, the manuscript reading unit 130, the image forming unit 140 and the sheet feeding unit 150, the communication I/F unit 160, the facsimile unit 170, the external storage device 180, the HDD 113, and the manipulation panel 115, and controls the entire MFP 100.

The automatic manuscript transportation device 120 automatically transports a plurality of manuscripts set on a manuscript tray to a predetermined manuscript reading position set on a platen glass of the manuscript reading unit 130 one by one, and ejects a manuscript in which an image formed on the manuscript is read by the manuscript reading unit 130, to a manuscript sheet ejection tray. The manuscript reading unit 130 includes a light source applying light to the manuscript transported to the manuscript reading position, and a photoelectric conversion element receiving light reflected on the manuscript, and scans a manuscript image according to the size of the manuscript. The photoelectric conversion element converts the received light into image data which is an electrical signal, and outputs the converted image data to the image forming unit 140.

The sheet feeding unit 150 transports a sheet stored in a sheet feeding tray, to the image forming unit 140. The image forming unit 140 forms an image by a known electrophotographic method, forms an image on the sheet transported by the sheet feeding unit 150, on the basis of image data after being subjected to data processing, in which image data input from the manuscript reading unit 130 is subjected to various data processing such as shading correction, or image data received from the outside, and ejects the sheet on which the image is formed, to a sheet ejection tray.

The communication I/F unit 160 is an interface for connecting the MFP 100 to the network 3. The communication I/F unit 160 is a communication protocol such as a TCP or a UDP, and communicates with the other computer connected to the network. Furthermore, the protocol for communication is not particularly limited, an arbitrary protocol can be used.

The communication I/F unit 160 outputs data received from the network 3, to the main substrate 111, and outputs data input from the main substrate 111, to the network 3. The communication I/F unit 160 outputs only data addressed to the MFP 100 in the data items received from the network 3, to the main substrate 111, and discards data addressed to a device different from the MFP 100, in the data items received from the network 3.

The facsimile unit 170 is connected to public switched telephone networks (PSTN), and transmits/receives facsimile data. The CD-ROM 181, or a semiconductor memory is mounted on the external storage device 180. The external storage device 180 reads out data stored in the CD-ROM 181 or the semiconductor memory. The external storage device 180 stores data in the CD-ROM 181 or the semiconductor memory.

The manipulation panel 115 is disposed on an upper surface of the MFP 100, and includes a display unit 118 and a manipulation unit 119. The display unit 118 is a display device such as a liquid crystal display device (LCD) and an organic ELD, and displays an instruction menu with respect to the user, information relevant to acquired image data, or the like. The manipulation unit 119 includes a plurality of hard keys, and a touch panel. The touch panel is a multi-touch compatible touch panel disposed to be superimposed on an upper surface or a lower surface of the display unit 118, and detects a position on a display surface of the display unit 118, which is instructed by the user.

Figure 4:
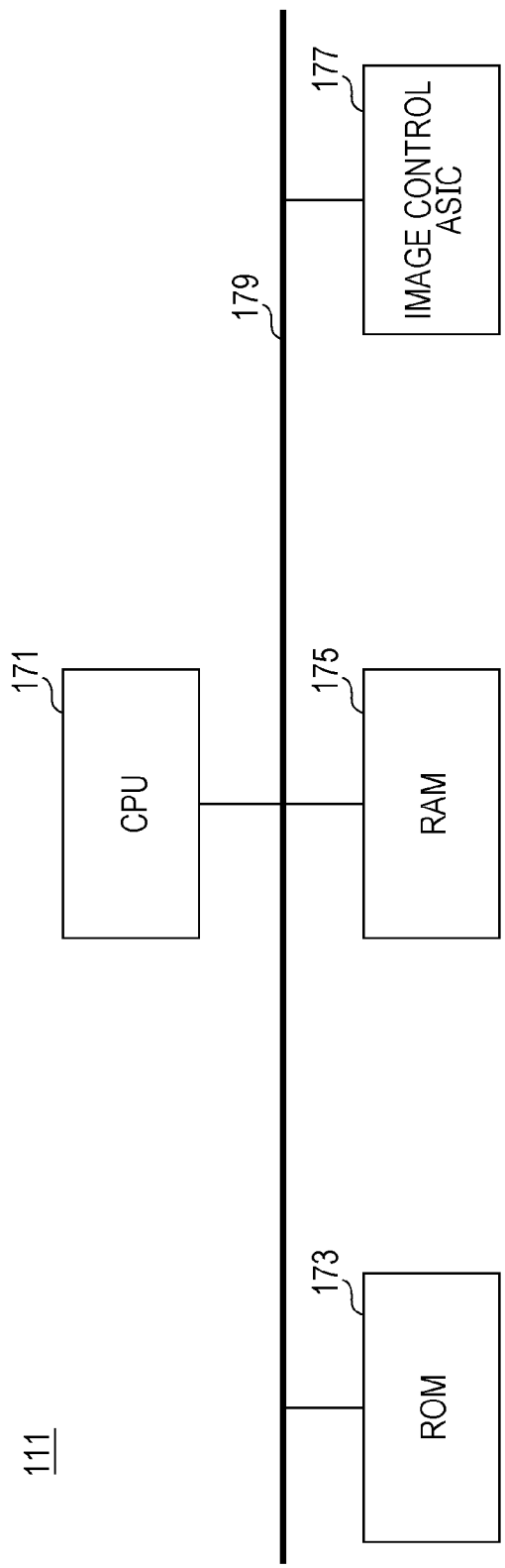
FIG. 4 is a block diagram illustrating an example of a detailed configuration of a main substrate according to one or more embodiments of the present invention.

FIG. 4 is a block diagram illustrating an example of a detailed configuration of the main substrate according to one or more embodiments of the present invention. With reference to FIG. 4, the main substrate 111 includes a CPU 171, a ROM 173, a RAM 175, and an image control application specific integrated circuit (ASIC) 177.

Each of the CPU 171, the ROM 173, the RAM 175, and the image control ASIC 177 is connected to a bus 179, and is capable of transferring data. The CPU 171 controls the entire MFP 100. The ROM 173 stores a program to be executed by the CPU 171. The RAM 175 is a volatile semiconductor memory to be used as a working area of the CPU 171.

The CPU 171 includes a plurality of arithmetic devices. Specifically, the CPU 171 is a quad-core processor including four CPU cores as four arithmetic devices. For this reason, the CPU 171 is capable of executing multiple kinds of processing in parallel. Furthermore, the number of arithmetic devices of the CPU 171 is not limited to four, and may be greater than or equal to two.

The CPU 171 executes the program stored in the HDD 113 by loading the program in the RAM 175. The program to be executed by the CPU 171, includes a control program for controlling hardware resources, and an application program. The hardware resources include the automatic manuscript transportation device 120, the manuscript reading unit 130, the image forming unit 140, the sheet feeding unit 150, the communication I/F unit 160, the facsimile unit 170, the HDD 113, and the manipulation panel 115. The application program, for example, includes a facsimile transmitting program of transmitting facsimile data by controlling the facsimile unit 170, a facsimile receiving program of receiving facsimile data by controlling the facsimile unit 170, a print program of receiving a print job by controlling the communication I/F unit 160, and of forming an image on the basis of the print job by controlling the image forming unit 140 and the sheet feeding unit 150, and a manuscript reading program of reading a manuscript by controlling the manuscript reading unit 130. In addition, the application program may include a maintenance program of managing an expendable item of the MFP 100, and an error state notifying program of notifying an error state. Furthermore, the application program to be executed by the CPU 171 is not limited thereto.

The image control ASIC 177 is connected to the automatic manuscript transportation device 120, the manuscript reading unit 130, the image forming unit 140, and the sheet feeding unit 150, and controls them. In addition, in the image control ASIC 177, a graphics processing unit (GPU) is built as an arithmetic device executing image processing. The GPU executes predetermined image processing with respect to image data which is a processing target, and executes image processing of converting the image data into raster data to be printed by the image forming unit 140. The GPU includes a raster image processor (RIP) executing image processing of converting vector image data into raster data.

The server 200 according to one or more embodiments of the present invention, includes a simulator simulating the MFPs 100, 100A, and 100B. The simulations of each of the MFPs 100, 100A, and 100B according to the server 200 are the same, and thus, here, a case where the server 200 simulates the MFP 100, will be described as an example.

Figure 5:
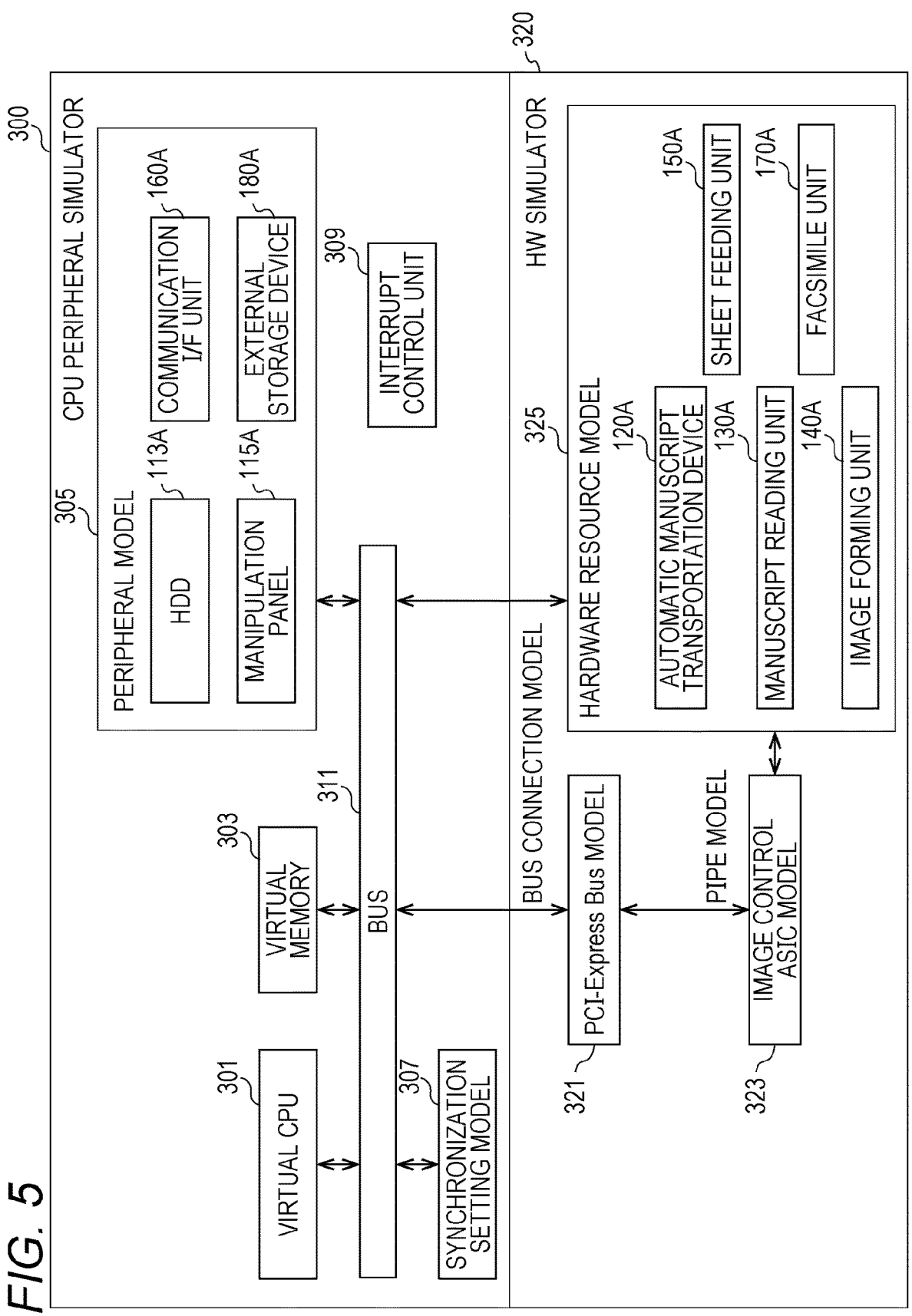
FIG. 5 is a diagram illustrating an example of an outline of a simulator of the server according to one or more embodiments of the present invention.

FIG. 5 is a diagram illustrating the outline of the simulator of the server according to one or more embodiments of the present invention. The CPU 201 executes a simulation program, and thus, the simulator is formed in the CPU 201. With reference to FIG. 5, the simulator includes a CPU peripheral simulator 300 and a hardware (HW) simulator 320. The CPU peripheral simulator 300 includes a virtual CPU 301 simulating the CPU 171 of the MFP 100, a virtual memory 303 emulating the ROM 173 and the RAM 175, a peripheral model 305, a synchronization setting model 307, and an interrupt control unit 309. The virtual CPU 301, the virtual memory 303, the peripheral model 305, and the synchronization setting model 307 are connected to a bus 311. The virtual CPU 301 includes four virtual CPU cores respectively simulating four CPU cores of the CPU 171.

The peripheral model 305 includes an HDD 113A emulating each of the HDD 113, the manipulation panel 115, the communication I/F unit 160, and the external storage device 180 of the MFP 100, a manipulation panel 115A, a communication I/F unit 160A, and an external storage device 180A.

The synchronization setting model 307 performs setting for the virtual CPU 301 to synchronize the virtual memory 303 and the peripheral model 305. The interrupt control unit 309 generates an interrupt on the virtual CPU 301 at the time of performing the setting for the virtual CPU 301 to synchronize the virtual memory 303 and the peripheral model 305.

The HW simulator 320 includes a PCI-Express Bus model 321, an image control ASIC model 323, and a hardware resources model 325. The PCI-Express Bus model 321 is connected to the bus 311, and emulates connection according to a PCI-Express standard. The image control ASIC model 323 emulates the image control ASIC 177 of the MFP 100. The hardware resources model 325 emulates the hardware resources of the MFP 100. Specifically, the hardware resources model 325 includes an automatic manuscript transportation device 120A emulating each of the automatic manuscript transportation device 120, the manuscript reading unit 130, the image forming unit 140, the sheet feeding unit 150, and the facsimile unit 170 of the MFP 100, a manuscript reading unit 130A, an image forming unit 140A, a sheet feeding unit 150A, and a facsimile unit 170A.

Figure 6:
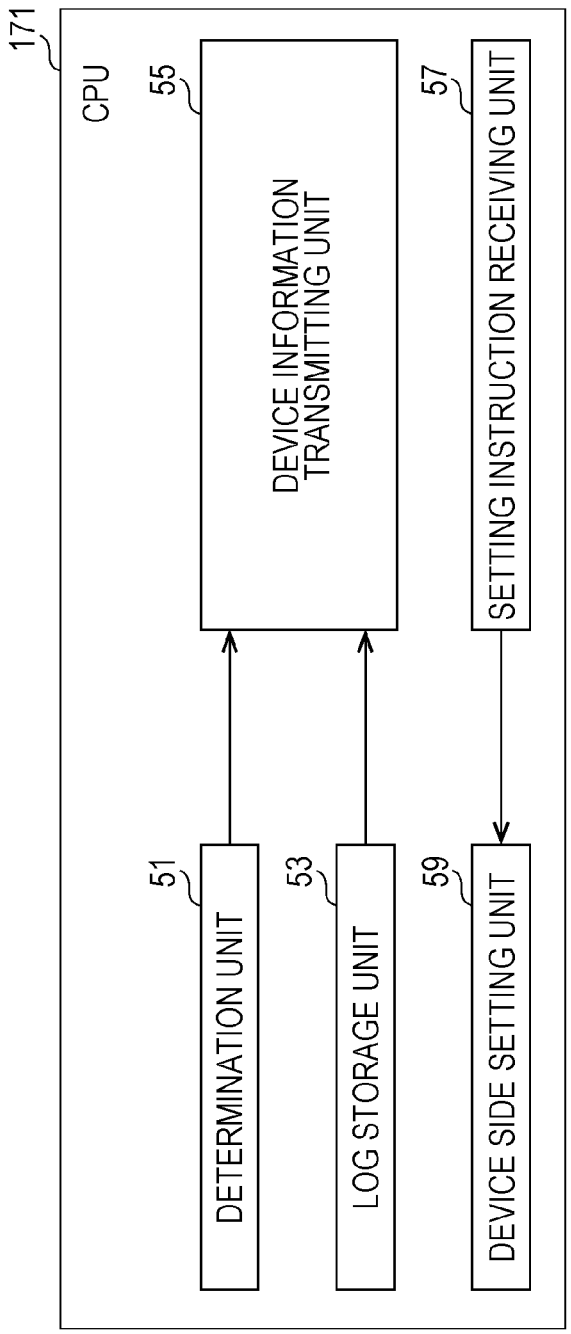
FIG. 6 is a block diagram illustrating an example of a function of a CPU of the MFP according to one or more embodiments of the present invention.

FIG. 6 is a block diagram illustrating an example of the function of the CPU of the MFP according to one or more embodiments of the present invention. The function illustrated in FIG. 6, is a function to be realized by the CPU 171 by executing a change request program stored in the ROM 173, the HDD 113, or the CD-ROM 181 by the CPU 171 of the MFP 100. The change request program is a part of a device setting program. With reference to FIG. 6, the CPU 171 includes a determination unit 51, a log storage unit 53, a device information transmitting unit 55, a setting instruction receiving unit 57, and a device side setting unit 59.

The determination unit 51 determines whether or not the state of the MFP 100 satisfies an admissibility condition. The state of the MFP 100 is a job processing speed. In a case where the state of the MFP 100 does not satisfy the admissibility condition, the determination unit 51 outputs a transmission instruction to the device information transmitting unit 55, and in a case where the state of the MFP 100 satisfies the admissibility condition, the determination unit 51 outputs a normal signal to the device information transmitting unit 55. The admissibility condition set in advance in the MFP 100, can be considered as a condition in which the job processing speed is greater than or equal to the lower limit value set in advance. In addition, even in a case where the job processing speed is less than the lower limit value, it may be considered that the admissibility condition is satisfied insofar as the job processing speed is continuously less than the lower limit value for a predetermined time or longer. In this case, in a case where a state in which the job processing speed is less than the lower limit value, is continuous for a predetermined time or longer, the determination unit 51 determines that the state of the MFP 100 does not satisfy the admissibility condition, outputs the transmission instruction to the device information transmitting unit 55, determines that the state of the MFP 100 satisfies the admissibility condition insofar as the state in which the job processing speed is less than the lower limit value, is continuous for a predetermined time or longer, and outputs the normal signal to the device information transmitting unit 55. In addition, the state of the MFP 100 may be a response time from the start to the end of the execution of certain processing. For example, in a case where the state of the MFP 100 is set to the response time, a time from the reception of the manipulation input by the user in the manipulation panel 115A to the display on a screen, is set to the response time.

In addition, in a case where the state of the MFP 100 does not satisfy the admissibility condition, the determination unit 51 measures a load of each of four CPU cores of the CPU 171, and outputs the load of each of four CPU cores to the device information transmitting unit 55, along with the transmission instruction. The load of the CPU core, for example, is a use rate of the CPU core.

The log storage unit 53 stores a log, which is the history of the job to be executed by the CPU 171, in the HDD 113. The job determines processing to be executed by the CPU 171. The log includes user identification information of the user instructing the execution of the job for each of the jobs, the job, a time when the job is received from the outside, a time when the job is executed, and processing data. The processing data is data which is a processing target of the CPU 171 executing the processing determined by the job. The processing data includes data received from an external device different from the MFP 100, in addition to data generated by the MFP 100. The data generated by the MFP 100, for example, includes data output by reading the manuscript by the manuscript reading unit 130. The data received from the external device, includes data stored in the HDD 113 by being received from the external device.

The device information transmitting unit 55 generates device information according to the input of the transmission instruction from the determination unit 51, and transmits the generated device information to the server 200 by controlling the communication I/F unit 160. The device information includes information relevant to the CPU 171 mounted on the MFP 100, hard information relevant to hardware resources installed in the MFP 100, soft information relevant to software resources installed in the MFP 100, log information, and the load of each of four CPU cores, which is input from the determination unit 51. The information relevant to the CPU 171, includes a model name of the CPU 171, and a rule parameter for determining a rule of assigning a task to each of four CPU cores. The rule parameter determines the type of task which can be assigned to each of four CPU cores. The rule parameter includes an assignment parameter of determining whether to execute a task relevant to image processing in the CPU 171 or to execute the task in the GPU of the image control ASIC 177.

The hard information includes hard identification information for identifying the hardware resources, and a hard parameter set for controlling the hardware resources. In the case of a plurality of hardware resources, the hard information includes the hard identification information and the hard parameter for each of the plurality of hardware resources. The soft information includes a program name of the program installed in the MFP 100, and a soft parameter set for executing the program. The log information includes a log corresponding to the job which is executed by the CPU 171, at a time point when the transmission instruction is input from the determination unit 51. The device information transmitting unit 55 extracts a log including the time point when the transmission instruction is input within a period specified by period information, in the jobs stored in the HDD 113 by the log storage unit 53, and generates log information including the extracted log. The setting instruction receiving unit 57 and the device side setting unit 59 will be described below.

Figure 7:
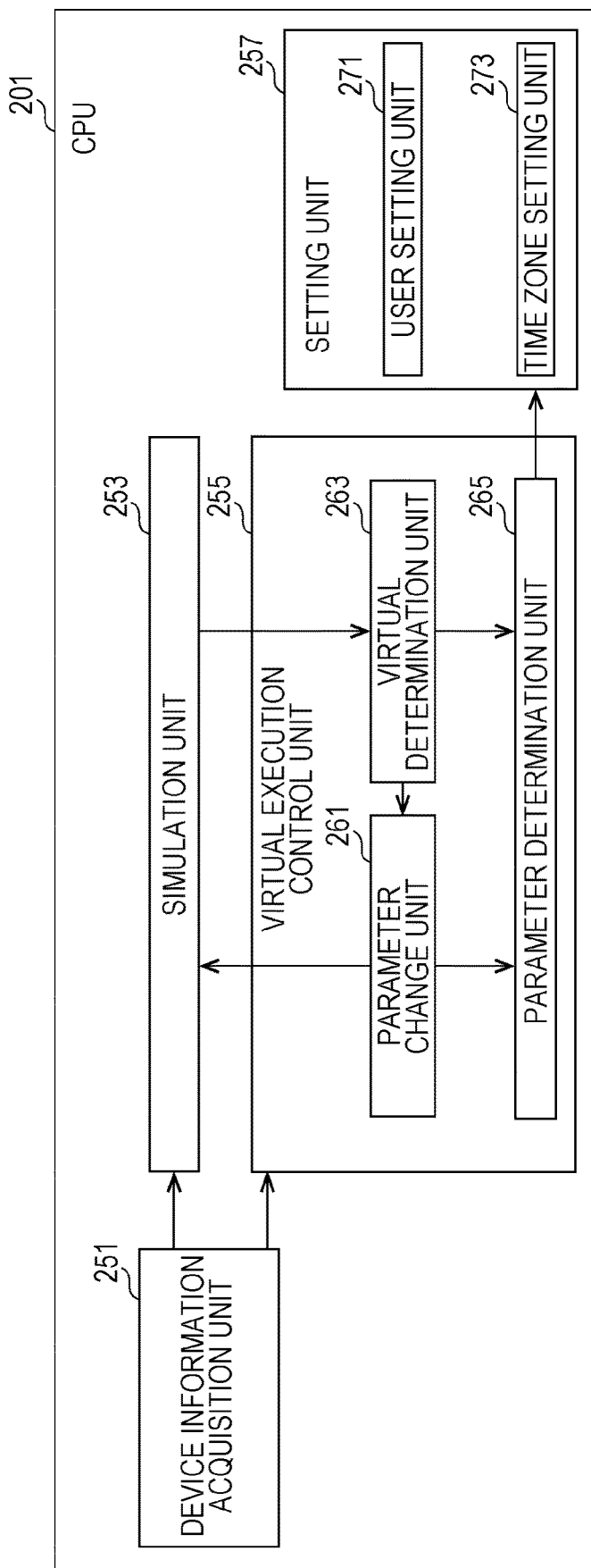
FIG. 7 is a block diagram illustrating an example of the function of the CPU of the server according to one or more embodiments of the present invention.

FIG. 7 is a block diagram illustrating an example of the function of the CPU of the server according to one or more embodiments of the present invention. The function illustrated in FIG. 7, is a function to be realized by the CPU 201 by executing a device setting program stored in the ROM 202, the HDD 204, or the CD-ROM 209 by the CPU 201 of the server 200.

With reference to FIG. 7, the CPU 201 of the server 200, includes a device information acquisition unit 251, a simulation unit 253, a virtual execution control unit 255, and a setting unit 257.

The device information acquisition unit 251 acquires the device information from any one of the MFPs 100, 100A, and 100B. As described above, in a case where the admissibility condition is not satisfied, any one of the MFPs 100, 100A, and 100B transmits the device information. In a case where the communication unit 205 receives the device information from any one of the MFPs 100, 100A, and 100B, the device information acquisition unit 251 acquires the device information received by the communication unit 205. Here, a case where the device information is acquired from the MFP 100, will be described as an example. In a case where the device information is acquired, the device information acquisition unit 251 outputs the device information to the simulation unit 253 and the virtual execution control unit 255.

The device information is input into the virtual execution control unit 255 from the device information acquisition unit 251. The virtual execution control unit 255 includes a parameter change unit 261, a virtual determination unit 263, and a parameter determination unit 265. The parameter change unit 261 changes the rule parameter which is determined by the information relevant to the CPU 171, included in the device information. The parameter change unit 261 changes the rule parameter such that a task assigned to a CPU core having a large load is assigned to a CPU core having a small load. For example, in four CPU cores, rule parameter is changed such that a task assigned to a CPU core having the maximum load, is assigned to a CPU core having the minimum load. In addition, the rule parameter may be changed such that four CPU cores are divided into a set of two CPU cores having a large load, and a set of two CPU cores having a small load, and a task assigned to any one of two CPU cores having a large load, is assigned to any one of two CPU cores having a small load.

In addition, the parameter change unit 261 changes the assignment parameter included in the rule parameter. In a case where it is determined that a task relevant to image processing is executed by the CPU 171 according to the assignment parameter, the parameter change unit 261 changes the parameter by assigning a task relevant to the image processing to be executed by the GPU, and in a case where it is determined that the task relevant to the image processing is executed by the GPU according to the assignment parameter, the parameter change unit 261 changes the parameter by assigning the task relevant to the image processing to be executed by the CPU 171. The virtual execution control unit 255 outputs the rule parameter changed by the parameter change unit 261, to the simulation unit 253.

The device information is input into the simulation unit 253 from the device information acquisition unit 251, and the changed rule parameter is input into the simulation unit 253 from the parameter change unit 261. The simulation unit 253 simulates the MFP 100. First, the simulation unit 253 sets the hardware resources mounted on the MFP 100, on the basis of the device information, causes the virtual CPU 301 to execute the software resources to be executed by the CPU 171 of the MFP 100, and sets the hard parameter, the soft parameter and the changed rule parameter input from the parameter change unit 261.

The MFP 100 includes the image control ASIC 177, the automatic manuscript transportation device 120, the manuscript reading unit 130, the image forming unit 140, the sheet feeding unit 150, the communication I/F unit 160, the facsimile unit 170, the external storage device 180, the HDD 113, and the manipulation panel 115, as the hardware resources. For this reason, the hard information included in the device information, determines the image control ASIC 177, the automatic manuscript transportation device 120, the manuscript reading unit 130, the image forming unit 140, the sheet feeding unit 150, the communication I/F unit 160, the facsimile unit 170, the external storage device 180, the HDD 113, and the manipulation panel 115, as the hardware resources. The simulation unit 253 sets an emulator emulating each of the image control ASIC 177, the automatic manuscript transportation device 120, the manuscript reading unit 130, the image forming unit 140, the sheet feeding unit 150, the communication I/F unit 160, the facsimile unit 170, the external storage device 180, the HDD 113, and the manipulation panel 115, which are determined by the hard information included in the device information, and sets the hard parameter included in the hard information. Further, the simulation unit 253 sets synchronization with the hardware resources to be emulated by the simulation unit 253. For example, a register value of the virtual CPU 301 is set in the synchronization setting model 307 of the CPU peripheral simulator 300 illustrated in FIG. 6, such that the virtual CPU 301 is synchronized with the emulator of the hardware resources, and a memory map of the virtual memory 303 is rewritten in the synchronization setting model 307.

In addition, the simulation unit 253 sets the software resources determined by the soft information included in the device information, to be in a state of being executed by the virtual CPU, and sets a setting value included in the device information. Specifically, the simulation unit 253 installs the software resources determined by the soft information included in the device information, and sets the setting value included in the device information. Accordingly, in the simulation unit 253, the virtual device simulating the MFP 100 is completed. Furthermore, data stored in the RAM 175 of the MFP 100 may be acquired as a snapshot, and may be stored in the virtual memory 303.

The simulation unit 253 causes the virtual CPU 301 to execute a job identical to the job executed by the CPU 171 of the MFP 100, on the basis of the device information. In this case, the simulation unit 253 assigns a task to four virtual CPU cores of the virtual CPU 301, according to the rule parameter changed by the parameter change unit 261. In addition, the simulation unit 253 assigns an image processing task to any one of the virtual CPU 301 and the image control ASIC 177, according to the assignment parameter included in the rule parameter changed by the parameter change unit 261. In a case where a plurality of logs are determined by the log information included in the device information, the simulation unit 253 determines a timing when each of the plurality of jobs is executed, according to the period information included in each of the plurality of logs, and executes each of the plurality of jobs at the determined timing. The period information indicates the date and time when the job is started, and a period from the start to the end of the job, and thus, the timing when the plurality of jobs are executed, is determined according to the date and time when each of the plurality of jobs is started. Specifically, an order of executing the plurality of jobs, is determined according to the date and time when each of the plurality of jobs is started. A timing when the second and subsequent jobs are started, may be determined on the basis of a job having the earliest value at the time of being started.

The virtual determination unit 263 determines whether or not the state of the virtual device in which the simulation unit 253 simulates the MFP 100, satisfies the admissibility condition set in advance in the MFP 100. The admissibility condition set in advance in the MFP 100, can be considered as a condition in which the job processing speed is greater than or equal to the lower limit value set in advance. In addition, even in a case where the job processing speed is less than the lower limit value, it may be considered that the admissibility condition is satisfied insofar as the job processing speed is continuously less than the lower limit value for a predetermined time. In a case where the state of the virtual device does not satisfy the admissibility condition, the virtual determination unit 263 outputs a change instruction to the parameter change unit 261, and in a case where the state of the virtual device satisfies the admissibility condition, the virtual determination unit 263 outputs a determination instruction to the parameter change unit 261 and the parameter determination unit 265.

The parameter change unit 261 changes the rule parameter according to the input of the change instruction from the virtual determination unit 263, and outputs a new rule parameter after being changed to the simulation unit 253. The simulation unit 253 causes the virtual CPU 301 to execute the job identical to the job executed by the CPU 171 of the MFP 100 whenever a new rule parameter is input from the parameter change unit 261. For this reason, the parameter change unit 261 determines the new rule parameter whenever the change instruction is input from the virtual determination unit 263, and the simulation unit 253 causes the virtual CPU 301 to execute one or more jobs according to the new rule parameter whenever the new rule parameter is determined by the parameter change unit 261. Such a cycle is repeated until the virtual determination unit 263 determines that the state of the virtual device in which the simulation unit 253 simulates the MFP 100, satisfies the admissibility condition set in advance in the MFP 100, while the simulation unit 253 causes the virtual CPU 301 to execute one or more jobs. The parameter change unit 261 outputs the rule parameter at the time point to the parameter determination unit 265, according to the input of the determination instruction from the virtual determination unit 263.

In a case where the determination instruction is input from the virtual determination unit 263, the parameter determination unit 265 determines the rule parameter input from the parameter change unit 261, as the change parameter, and outputs the change parameter to the setting unit 257. In addition, the parameter determination unit 265 outputs the user identification information of the user instructing the execution of the job executed by the virtual device, to the setting unit 257, on the basis of the log information included in the device information. Further, the parameter determination unit 265 outputs the period information of the job executed by the virtual device, to the setting unit 257, on the basis of the log information included in the device information.

In a case where the environment of the MFP 100 becomes identical to an environment at a time point when the state of the MFP 100 is out of the admissibility condition, the setting unit 257 controls the MFP 100 such that the change parameter is set in the MFP 100, according to the input of the change parameter from the parameter determination unit 265. The setting unit 257 includes a user setting unit 271 and a time zone setting unit 273. The user setting unit 271 transmits a first command of setting the change parameter, to the MFP 100, while the user identified by the user identification information input from the parameter determination unit 265 uses the MFP 100. The first command includes the user identification information and the change parameter.

The time zone setting unit 273 transmits a second command of setting the change parameter, to the MFP 100, in a time zone including a time to be specified by the period information input from the parameter determination unit 265. The second command includes the time zone and the change parameter. The setting unit 257 activates any one of the user setting unit 271 and the time zone setting unit 273. Which one of the user setting unit 271 and the time zone setting unit 273 is activated, may be set in advance.

Returning to FIG. 6, the setting instruction receiving unit 57 controls the communication I/F unit 160, and receives any one of the first command and the second command from the server 200. The setting instruction receiving unit 57 outputs the first command or the second command received from the server 200, to the device side setting unit 59.

In a case where the first command is input into the communication I/F unit 160 from the server 200, the device side setting unit 59 executes the first command, and sets the change parameter included in the first command while the user identified by the user identification information included in the first command uses the MFP 100. For this reason, the rule parameter is changed to the change parameter only while the user executing the job in which the MFP 100 was out of the admissibility condition in the past, uses the MFP 100. The user using the MFP 100, includes a user using the manipulation panel 115, a user remotely manipulating the MFP 100 from an external PC, a user manipulating an external PC, who instructs the transmission of the print job to the PC. The user using the manipulation panel 115 and the user remotely manipulating the MFP 100 from the external PC, may be specified according to user authentication. In addition, the user manipulating the external PC, who instructs the transmission of the print job to the PC, may be specified on the basis of the user identification information included in the received job, such that the user identification information of the user instructing the transmission of the print job, is included in the print job.

In a case where second command is input, the device side setting unit 59 sets the change parameter included in the second command, only in the time zone included in the second command. For this reason, the rule parameter is changed to the change parameter, only in the time zone including a time when the MFP 100 was out of the admissibility condition in the past.

Next, the determination of the change parameter will be described in detail. FIG. 8 is a diagram illustrating an example of the rule parameter. The rule parameter determines the type of task which can be assigned to each of four CPU cores of the MFP 100. In FIG. 8, four CPU cores are illustrated by a core 1, a core 2, a core 3, and a core 4. In addition, seven types of vector data generation, rasterization, data conversion, communication, scanning, browsing, and an internal server are illustrated as a task type. A task of which the task type is the vector data generation, is a task of executing processing of generating vector data. A task of which the task type is the rasterization, is a task of executing processing of generating raster data from the vector data. A task of which the task type is the data conversion, is a task of executing processing of changing the format of the data. A task of which the task type is the communication, is a task of executing processing of transmitting/receiving the data. A task of which the task type is the scanning, is a task of executing processing of reading the manuscript by controlling the manuscript reading unit 130. A task of which the task type is the browsing, is a task of executing a browsing program. A task of which the task type is the scanning, is a task of executing processing of reading the manuscript by controlling the manuscript reading unit 130. A task of which the task type is the internal server, is a task of executing processing for functioning as a server.

The task types of the vector data generation, the rasterization, the data conversion, the communication, and the scanning are assigned to a CPU core of the core 1. The task types of the vector data generation and the rasterization are assigned to a CPU core of the core 2. The task type of the browsing is assigned to a CPU core of the core 3. The task type of the internal server is assigned to a CPU core of the core 4.

FIG. 9 is a first diagram illustrating an example of the assignment of the task with respect to four CPU cores. FIG. 9 illustrates an example of the task assigned to each of four CPU cores in the case of being out of the admissibility condition in a state illustrated in FIG. 8, in which the rule parameter is set. In FIG. 9, the task of which the task type is the vector data generation, is illustrated by Rip1 to Rip4, the task of which the task type is the rasterization, is illustrated by Raster1 to Raster4, the task of which the task type is the data conversion, is illustrated by Cony, the task of which the task type is the communication, is illustrated by Nicfum, the task of which the task type is the scanning, is illustrated by Scan, the task of which the task type is the browsing, is illustrated by Browser, and the task of which the task type is the internal server, is illustrated by IWS.

Seven tasks of Scan, Cony, Nicfum, Raster1, Raster2, Rip1, and Rip2, are assigned to the CPU core of the core 1. Four tasks of Raster3, Raster4, Rip3, and Rip4, are assigned to the CPU core of the core 2. One task of Browser, is assigned to the CPU core of the core 3. One task of IWS, is assigned to the CPU core of the core 4.

FIG. 10 is a first diagram illustrating the use rate for each of the tasks with respect to each of four CPU cores. FIG. 10 illustrates a use rate in a case where the task illustrated in FIG. 9 is assigned. In the CPU core of the core 1, a use rate of the task of Scan is 1, a use rate of the task of Conv is 1, a use rate of the task of Nicfum is 8, a use rate of the task of Raster1 is 5, a use rate of the task of Raster2 is 5, a use rate of the task of Rip1 is 40, and a use rate of the task of Rip2 is 40. For this reason, the total use rate of the CPU core of the core 1 is 100.

In the CPU core of the core 2, a use rate of the task of Raster3 is 30, a use rate of the task of Raster4 is 30, a use rate of the task of Rip3 is 20, and a use rate of the task of Rip4 is 20. For this reason, the total use rate of the CPU core of the core 2 is 100.

In the CPU core of the core 3, a use rate of the task of Browser is 30. For this reason, the total use rate of the CPU core of the core 3 is 30. In the CPU core of the core 4, a use rate of the task of IWS is 5. For this reason, the total use rate of the CPU core of the core 4 is 5.

FIG. 11 is a diagram illustrating an example of the change parameter. With reference to FIG. 11, the change parameter is different from the rule parameter illustrated in FIG. 8, in that the task type of the rasterization is added to the CPU core of the core 3 in addition to the task type of the browsing, and the task type of the rasterization is added to the CPU core of the core 4 in addition to the task type of the internal server.

Figures 12, 13:
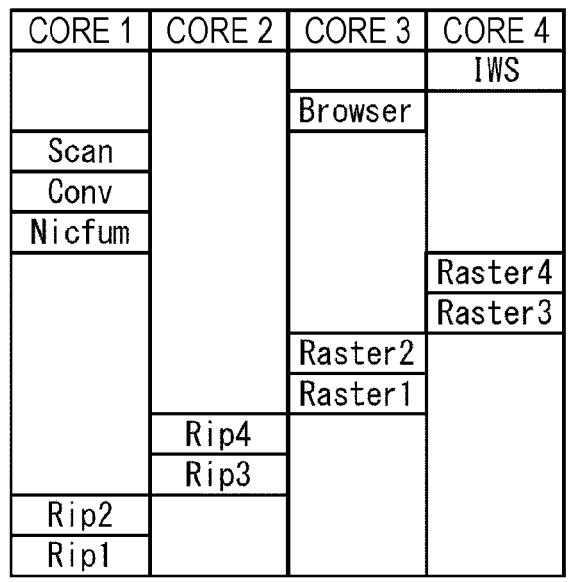
FIG. 12 is a second diagram illustrating an example of assigning the task to four CPU cores.
FIG. 13 is a second diagram illustrating the use rate for each of the tasks with respect to each of four CPU cores.

FIG. 12 is a second diagram illustrating an example of the assignment of the task with respect to four CPU cores. With reference to FIG. 12, the assignment is different from the task assignment illustrated in FIG. 9, in that two tasks of Raster1 and Raster2 assigned to the CPU core of the core 1, are assigned to the CPU core of the core 3, and two tasks of Raster3 and Raster4 assigned to the CPU core of the core 2, are assigned to the CPU core of the core 4.

FIG. 13 is a second diagram illustrating a use rate for each of the tasks with respect to each of four CPU cores. With reference to FIG. 13, two tasks of Raster1 and Raster2 are not assigned to the CPU core of the core 1, and thus, the total use rate of the CPU core of the core 1 decreases to 90. In addition, two tasks of Raster3 and Raster4 are not assigned to the CPU core of the core 2, and thus, the use rate of two tasks of Rip3 and Rip4 increases from 20 to 40, but the total use rate of the CPU core of the core 2 decreases to 80.

In addition, two tasks of Raster1 and Raster2 are newly assigned to the CPU core of the core 3, the use rate of each of the two tasks is 30, and the total use rate of the CPU core of the core 3 increases to 90. The use rate of two tasks of Raster1 and Raster2 is 5 at the time of being assigned to the CPU core of the core 1, but the use rate increases to 30 by assigning the two tasks to the CPU core of the core 3. For this reason, a processing speed of two tasks of Raster1 and Raster2 becomes faster.

In addition, two tasks of Raster3 and Raster4 are newly assigned to the CPU core of the core 4, the use rate of each of the two tasks is 40, and the total use rate of the CPU core of the core 4 increases to 85. The use rate of two tasks of Raster3 and Raster4 is 30 in the case of being assigned to the CPU core of the core 2, but the use rate increases to 40 by assigning the two tasks to the CPU core of the core 4. For this reason, a processing speed of two tasks of Raster3 and Raster4 becomes faster.

Figure 14:
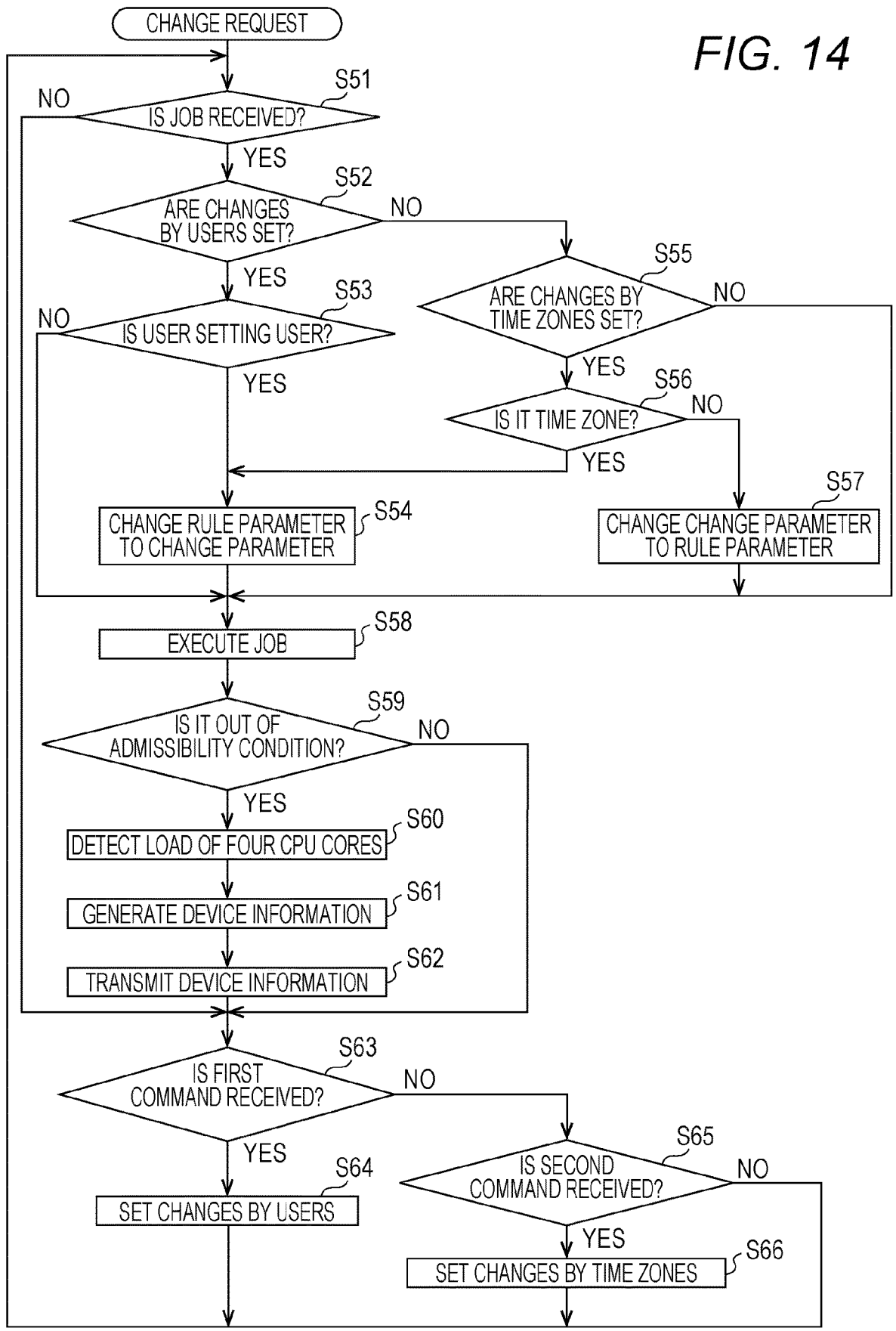
FIG. 14 is a flowchart illustrating an example of a flow of setting request processing according to one or more embodiments of the present invention.

FIG. 14 is a flowchart illustrating an example of a flow of change request processing according to one or more embodiments of the present invention. The change request processing is a function to be realized by the CPU 201 by executing the change request program stored in the ROM 173, the HDD 113, or the CD-ROM 181 by the CPU 171 of the MFP 100. The change request program is a part of the device setting program. With reference to FIG. 14, the CPU 171 determines whether or not the job is received (Step S51). In a case where the job is received, the processing proceeds to Step S52, and in a case where the job is not received, the processing proceeds to Step S63. The CPU 171 receives a job while the communication I/F unit 160 receives a job from the external PC or the like. In addition, in a case where the manipulation unit 119 receives a manipulation of inputting a job by the user, the CPU 171 receives the job. The details of the processing of Step S52 to Step S57 will be described below.

In Step S58, the execution of the job received in Step S51, is started, and the processing proceeds to Step S59. In Step S59, it is determined whether or not it is out of the admissibility condition. In a case where the job processing speed is less than or equal to a threshold value set in advance, it is determined that it is out of the admissibility condition. In a case where it is out of the admissibility condition, the processing proceeds to Step S60, and in a case where it is not out of the admissibility condition, the processing proceeds to Step S63.

In Step S60, the load of each of four CPU cores of the CPU 171 is detected. Then, the device information is generated (Step S61), the communication I/F unit 160 is controlled, the device information is transmitted to the server 200 (Step S62), and the processing proceeds to Step S63.

In Step S63, it is determined whether or not the first command is received from the server 200. In a case where the first command is received, the processing proceeds to Step S64, and in a case where the first command is not received, the processing proceeds to Step S65. In Step S64, changes by the users are set, and the processing returns to Step S51. The setting of the changes by the users is setting of changing the rule parameter to the change parameter included in the first command while the user identified by the user identification information included in the first command, manipulates the MFP 100. In this case, the user identification information and the change parameter included in the first command are temporarily stored.

In Step S65, it is determined whether or not the second command is received from the server 200. In a case where the second command is received, the processing proceeds to Step S66, and in a case where the second command is not received, the processing returns to Step S51. In Step S66, changes by time zones are set, and the processing returns to Step S51. The setting of the changes by time zones is setting of changing only a time zone included in the second command, and the rule parameter to the change parameter included in the second command. In this case, the time zone and the change parameter included in the second command are temporarily stored.

In Step S51, in a case where the job is received, in Step S52, it is determined whether or not the changes by the users are set. In a case where Step S64 is executed before Step S52 is executed, the changes by the users are set. In a case where the changes by the users are set, the processing proceeds to Step S53, and in a case where the changes by the users are not set, the processing proceeds to Step S55. In Step S53, it is determined whether or not the user instructing the execution of the job received in Step S51 is a setting user. The setting user is a user to be specified by the user identification information which is temporarily stored in the setting processing of the changes by the users in Step S64. In a case where the user identification information of the user instructing the execution of the job is identical to the user identification information of the setting user, which is temporarily stored, the processing proceeds to Step S54, and in a case where the user identification information of the user instructing the execution of the job is not identical to the user identification information of the setting user, the processing proceeds to Step S58. In Step S54, the rule parameter is changed to the change parameter temporarily stored in the setting processing of the changes by the users, which is executed in Step S64, and the processing proceeds to Step S58.

In Step S55, it is determined whether or not the changes by time zones are set. In a case where Step S66 is executed before Step S55 is executed, the changes by time zones are set. In a case where the changes by time zones are set, the processing proceeds to Step S56, and in a case where the changes by time zones are not set, the processing proceeds to Step S57. In Step S56, it is determined whether or not the current time is within the time zone set in the setting processing of the changes by time zones. In a case where the current time is within the time zone temporarily stored in the setting processing of the changes by time zones, which is executed in Step S66, the processing proceeds to Step S54, and in a case where the current time is not within the time zone temporarily stored in the setting processing of the changes by time zones, the processing proceeds to Step S57. In Step S54, the rule parameter is changed to the change parameter temporarily stored in the setting processing of the changes by time zones, which is executed in Step S66, and the processing proceeds to Step S58. In Step S57, the change parameter is changed to the rule parameter, and the processing proceeds to Step S58.

Figure 15:
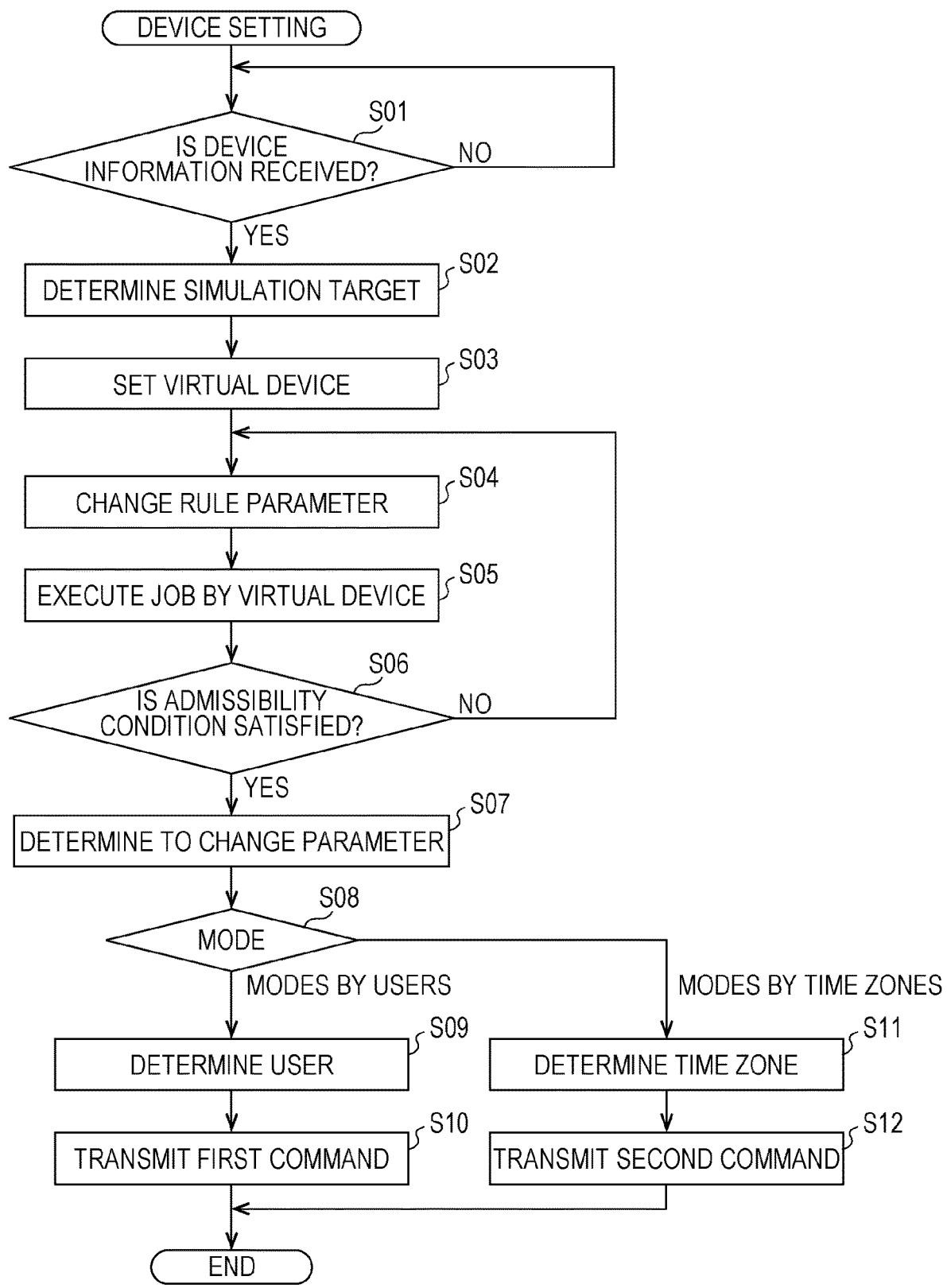
FIG. 15 is a flowchart illustrating an example of a flow of device setting processing according to one or more embodiments of the present invention.

FIG. 15 is a flowchart illustrating an example of a flow of device setting processing according to one or more embodiments of the present invention. The device processing is processing to be executed by the CPU 201 by executing the device setting program stored in the ROM 202, the HDD 204, or the CD-ROM 209 by the CPU 201 of the server 200 according to one or more embodiments of the present invention. With reference to FIG. 15, it is determined whether or not the CPU 201 of the server 200 receives the device information. A standby state is maintained until the communication unit 205 receives the device information from any one of the MFPs 100, 100A, and 100B (NO in Step S01), and in a case where the device information is received from any one of the MFPs 100, 100A, and 100B (YES in Step S01), the processing proceeds to Step S02.

In Step S02, a device transmitting the device information is determined as a simulation target, and the processing proceeds to Step S03. Here, a case where the device information is received from the MFP 100, will be described as an example. In this case, the MFP 100 is determined as the simulation target. In Step S03, the virtual device is set. In Step S01, a virtual device simulating the MFP 100, which is the simulation target, is set on the basis of the received device information. Specifically, an emulator emulating the hardware resources determined by the hard information included in the device information, is set, the software resources determined by the soft information included in the device information are set to be executed by the virtual CPU 301, and the rule parameter included in the device information is set.

Next, in Step S04, the rule parameter is changed. The rule parameter determines a rule by assigning a task to each of four CPU cores of the MFP 100. Specifically, the rule parameter is changed such that a task assigned to a CPU core having a large load, is assigned to a CPU core having a small load, on the basis of the load of each of four CPU cores, which is included in the device information. In addition, in a case where it is determined that a task relevant to the image processing is executed by the CPU 171, according to the assignment parameter included in the rule parameter, the parameter is changed by assigning the task relevant to the image processing to be executed by the GPU, and in a case where it is determined that the task relevant to the image processing is executed by the GPU, according to the assignment parameter, the parameter is changed by assigning the task relevant to the image processing to be executed by the CPU 171.

Next, in Step S05, the virtual device set in Step S03 executes the job included in the device information received in Step S01. Then, it is determined whether or not the admissibility condition is satisfied (Step S06). In a case where the job processing speed is greater than the threshold value set in advance, it is determined that the admissibility condition is satisfied. In a case where the admissibility condition is satisfied, the processing proceeds to Step S07, and in a case where the admissibility condition is not satisfied, the processing returns to Step S04. In Step S04, the rule parameter is changed to a rule parameter different from the rule parameter changed in advance.

In a case where the processing proceeds to Step S07, the rule parameter changed in Step S04, is a parameter satisfying the admissibility condition at the time of executing the job. In Step S07, the changed rule parameter is determined as the change parameter, and the processing proceeds to Step S08.

In Step S08, it is determined whether to set a mode which to modes by users or modes by time zones. In a case where the mode is set to the modes by users, the processing proceeds to Step S09, and in a case where the mode is set to the modes by time zones, the processing proceeds to Step S11.

In Step S09, a user instructing the execution of the job executed by the virtual device in Step S05, is determined. Then, the first command is transmitted to the MFP 100, which is the simulation target (Step S10), and the processing is ended. The first command includes the user identification information of the user specified in Step S09, and the change parameter determined in Step S07.

In Step S11, a time zone including a time when the job executed by the virtual device in Step S05 is executed by the MFP 100, is determined. Then, the second command is transmitted to the MFP 100, which is the simulation target (Step S12), and the processing is ended. The second command includes the time zone determined in Step S11, and the change parameter determined in Step S07.

As described above, the server 200 according to one or more embodiments of the present invention functions as the simulation device, and each of the MFPs 100, 100A, and 100B functions as the information processing device. Then, for example, in a case where the state of the MFP 100 is out of the admissibility condition set in advance, the server 200 simulates the MFP 100, the job identical to the job executed by the MFP 100 is executed in a state where the parameter different from the parameter set in the MFP 100, is set in the virtual device simulating the MFP 100, and in a case where the state of the virtual device while the virtual device executes the job, satisfies the admissibility condition, the parameter set in the virtual device is determined as the change parameter. Then, in a case where the environment of the MFP 100 becomes identical to the environment at the time point when the state of the MFP 100 is out of the admissibility condition, the server 200 controls the MFP 100 such that the determined change parameter is set in the MFP 100. For this reason, it is possible to set a change parameter suitable for a use environment of the MFP 100, in the MFP 100. Therefore, it is possible to set the MFP 100 to be in a state suitable for the use environment.

In addition, in a case where the user instructing the execution of the job which is executed by the MFP 100 at the time points where the MFP 100 does not satisfy the admissibility condition, uses the MFP 100, the change parameter is set, and thus, it is possible to adapt the information processing device to the use environment which is changed for each of the users.

In addition, the change parameter is set in the time zone including the time point when the MFP 100 does not satisfy the admissibility condition, and thus, it is possible to adapt the information processing device to the use environment which is changed for each of the time zones.

In addition, in a case where the state of the MFP 100 is out of the admissibility condition, the server 200 causes the virtual device to execute the job identical to the job executed by the MFP 100, in a state where the rule parameter for determining the condition of assigning the task to four CPU cores of the CPU 171, is changed, and in a case where the state of the virtual device satisfies the admissibility condition, the rule parameter set in the virtual device is determined as the change parameter. For this reason, the assignment of the task with respect to each of four CPU cores, can be assignment suitable for the job to be executed by the MFP 100.

In addition, in four CPU cores of the CPU 171, the server 200 changes the rule parameter such that a task assigned to a core having a large use rate at the time point when the state of the MFP 100 is out of the admissibility condition, is assigned to a core having a small use rate. For this reason, it is possible to disperse the load by four CPU cores.

In addition, the server 200 changes the assignment parameter included in the rule parameter, and thus, it is possible to compare a case where a certain task is executed by the GPU, with a case where a certain task is not executed by the GPU.

Furthermore, in one or more embodiments of the present invention described above, the server 200 has been described as an example of the simulation device, but one or more embodiments of the present invention can be understood as a device setting method of causing the device setting processing illustrated in FIG. 15 to be executed by the server 200, and of causing the change request processing illustrated in FIG. 14 to be executed by the MFP 100, and a device setting program of causing the device setting processing to be executed by the CPU 201 of the server 200, and of causing the change request processing to be executed by the CPU 171 of the MFP 100.

Although embodiments of the present invention have been described and illustrated in detail, the disclosed embodiments are made for purposes of illustration and example only and not limitation. The scope of the present invention should be interpreted by terms of the appended claims, and it is intended that all modifications within the meaning and the scope equivalent to the claims are included.

APPENDIX (1) In the simulation device according to any one of claims 1 to 7, the admissibility condition is a condition in which a speed of executing the job is greater than or equal to a predetermined speed. According to this aspect, a change parameter in which the speed of executing the job is less than the predetermined speed, is determined, and thus, the information processing device can be set such that the speed of executing the job in the information processing device is greater than or equal to the predetermined speed.

(2) In the simulation device according to any one of claims 1 to 9, and (1), the admissibility condition is a condition in which the number of times to be a state where the speed of executing the job is less than the predetermined speed, is less than or equal to a predetermined number of times within a predetermined time. According to this aspect, in a case where the number of times to be the state where the speed of executing the job is less than the predetermined speed, is greater than the predetermined number of times within the predetermined time, the parameter is changed, and thus, the information processing device can be set such that the number of times to be the state where the speed of executing the job in the information processing device is less than or equal to the predetermined speed, is less than or equal to the predetermined number of times within the predetermined time.

(3) In the simulation device according to any one of claims 1 to 9, (1), and (2), the virtual execution controller causes the virtual device to execute one or more jobs identical to one or more jobs executed by the information processing device, on the basis of the history of executing one or more jobs by the information processing device. According to this aspect, a state where the information processing device executes the job, can be accurately reproduced by the virtual device.

(4) In the simulation device according to (3), the history includes the job, a time when the job is received from the outside, and a time when the job is executed, with respect to each of one or more jobs executed by the information processing device. According to this aspect, the state where the information processing device executes the job, can be accurately reproduced by the virtual device.

What is claimed is:

1. A simulation device comprising:
   a central processing unit (CPU) that:
   simulates an information processing device on a virtual device,
   when a state of the information processing device is out of an admissibility condition, executes a job identical to a job executed by the information processing device in a state where a parameter set in the virtual device is different from a parameter set in the information processing device,
   determines the parameter set in the virtual device, as a change parameter, when a state of the virtual device while the virtual device executes the job satisfies the admissibility condition, and
   controls the information processing device and sets the determined change parameter in the information processing device when an environment of the information processing device is identical to an environment at a time when the state of the information processing device is out of the admissibility condition.

2. The simulation device according to claim 1, wherein, in the environment identical to the environment in which the state of the information processing device is out of the admissibility condition, is an environment in which a user who instructs the execution of the job executed by the information processing device is using the information processing device.

3. The simulation device according to claim 1, wherein the environment identical to the environment in which the state of the information processing device is out of the admissibility condition is in a time zone that includes a time when the information processing device executes the job.

4. The simulation device according to claim 1, wherein the CPU further changes a parameter that determines a condition of assigning a task to a plurality of hardware processors of the information processing device.

5. The simulation device according to claim 4, wherein the CPU changes the parameter and assigns a task to a hardware processor that has a small use rate in the plurality of hardware processors,
wherein the task is assigned to a hardware processor that has a large use rate at a time when the state of the information processing device is out of the admissibility condition.

6. The simulation device according to claim 4, wherein the plurality of hardware processors comprise a graphics processing unit (GPU) that executes image processing, and
the CPU changes a parameter that determines whether or not to assign a task to the GPU.

7. A device setting method of causing a simulation device to execute:
   simulating an information processing device on a virtual device;
   when a state of the information processing device is out of an admissibility condition, executing a job identical to a job executed by the information processing device in a state where a parameter set in the virtual device is different from a parameter set in the information processing device;
   determining the parameter set in the virtual device, as a change parameter, when a state of the virtual device while the virtual device executes the job satisfies the admissibility condition; and
   controlling the information processing device and setting the determined change parameter in the information processing device when an environment of the information processing device is identical to an environment at a time when the state of the information processing device is out of the admissibility condition.

8. A non-transitory recording medium storing a computer readable device setting program causing a computer controlling a simulation device to perform:
   simulating an information processing device on a virtual device;
   when a state of the information processing device is out of an admissibility condition, executing a job identical to a job executed by the information processing device in a state where a parameter set in the virtual device is different from a parameter set in the information processing device;
   determining the parameter set in the virtual device, as a change parameter, when a state of the virtual device while the virtual device executes the job satisfies the admissibility condition; and
   controlling the information processing device and setting the determined change parameter in the information processing device when an environment of the information processing device is identical to an environment at a time when the state of the information processing device is out of the admissibility condition.

* * * * *